US010529247B1

(12) United States Patent
McCartin-Lim (10) Patent No.: US 10,529,247 B1
(45) Date of Patent: Jan. 7, 2020

(54) INTERACTIVE COMPUTER SYSTEM FOR TUTORING PROOF CONSTRUCTION

(71) Applicant: Mark McCartin-Lim, Oakland, CA (US)

(72) Inventor: Mark McCartin-Lim, Oakland, CA (US)

( * ) Notice: Subject to any disclaimer, the term of this patent is extended or adjusted under 35 U.S.C. 154(b) by 295 days.

(21) Appl. No.: 15/236,454

(22) Filed: Aug. 14, 2016

(51) Int. Cl.
| G09B 19/00 | (2006.01) |
| G09B 7/04  | (2006.01) |
| G09B 5/12  | (2006.01) |
| G09B 5/06  | (2006.01) |
| G09B 19/02 | (2006.01) |

(52) U.S. Cl.
CPC ............... *G09B 7/04* (2013.01); *G09B 5/065* (2013.01); *G09B 5/12* (2013.01); *G09B 19/0053* (2013.01); *G09B 19/025* (2013.01)

(58) Field of Classification Search
None
See application file for complete search history.

(56) References Cited

U.S. PATENT DOCUMENTS

| 5,584,699 | A | * | 12/1996 | Silver | G09B 7/04 434/188 |
| 5,870,731 | A | * | 2/1999 | Trif | G06N 5/048 434/118 |
| 5,992,849 | A | * | 11/1999 | Olti | A63F 9/24 273/153 R |
| 7,752,148 | B2 | * | 7/2010 | Yu | G09B 19/025 434/188 |
| 8,660,972 | B1 | * | 2/2014 | Heidenreich | G06N 5/00 706/45 |
| 2010/0291518 | A1 | * | 11/2010 | Wong | G09B 23/02 434/211 |

* cited by examiner

*Primary Examiner* — Sunit Pandya (57) ABSTRACT

A computerized tutoring system for teaching students how to construct proofs associated with computer science, logic, math, and other studies. The self tutoring system employs an interactive computer programmed with a proof problem and access to assumptions and assertions for a student to study. The student tries to solve the problem by interacting with the computer to choose and interconnect appropriate assumptions and assertions as required for the proof. The system provides immediate feedback for the student to correct mistakes and information on the student's learning progress. The level of tutoring may adjusted to suit the needs of the student. The tutoring system may include audio and visual effects to entertain the student during the tutoring process. One embodiment involves symbols to represent the assumptions and assertions, and the text of the assumptions and assertions may be toggled off to reduce distracting clutter on the computer display screen.

27 Claims, 5 Drawing Sheets

Suppose there are 3 alligators named Aziz, Burt, and Chaz with the assumptions shown below. ─── 1
Prove that Chaz is not muddy.

Assumptions ── 2              Your Proof

An alligator is wet if and only if it went in the river or it went in the swamp.

Aziz went in the river.

Burt is muddy.

Every muddy alligator went in the swamp, and every alligator who went in the river is not muddy.
                                            ── 5
Not all three alligators are wet.

Assertions ── 3

Alligators that are not wet did not go in the river or swamp.
At least one of the 3 alligators, Chaz, Aziz, or Burt is not wet.
Aziz and Burt are muddy.
Aziz and Burt are not wet.  ── 6
Aziz is wet.
Aziz or Burt is not wet.
Burt is wet.
Burt went in the swamp.
Chaz did not go in the swamp.
Chaz is not muddy.
Chaz is not wet.
Every alligator that did not go in the swamp is not muddy.
Every alligator that is muddy did not go in the river.
If Aziz went in the river, then Aziz is not muddy.
If Aziz went in the river, then Aziz is wet.
If Aziz went in the swamp, then Aziz is muddy.
If Burt is muddy, then Burt went in the swamp.
If burt went in the river, then Burt is not muddy.
If Burt went in the river, then Burt is wet.
If Burt went in the swamp, then Burt is wet.
If Chaz went in the river, then Chaz is not muddy.

4

Suppose there are 3 alligators named Aziz, Burt, and Chaz with the assumptions shown below. Prove that Chaz is not muddy.

Assumptions —2

An alligator is wet if and only if it went in the river or it went in the swamp.

Aziz went in the river.

Burt is muddy.

Every muddy alligator went in the swamp, and every alligator who went in the river is not muddy. —5

Not all three alligators are wet.

Assertions —3

Alligators that are not wet did not go in the river or swamp.
At least one of the 3 alligators, Chaz, Aziz, or Burt is not wet.
Aziz and Burt are muddy. —6
Aziz and Burt are not wet.
Aziz is wet.
Aziz or Burt is not wet.
Burt is wet.
Burt went in the swamp.
Chaz did not go in the swamp.
Chaz is not muddy.
Chaz is not wet.
Every alligator that did not go in the swamp is not muddy.
Every alligator that is muddy did not go in the river.
If Aziz went in the river, then Aziz is not muddy.
If Aziz went in the river, then Aziz is wet.
If Aziz went in the swamp, then Aziz is muddy.
If Burt is muddy, then Burt went in the swamp.
If burt went in the river, then Burt is not muddy.
If Burt went in the river, then Burt is wet.
If Burt went in the swamp, then Burt is wet.
If Chaz went in the river, then Chaz is not muddy.

Your Proof —1

INTERACTIVE COMPUTER SYSTEM FOR TUTORING PROOF CONSTRUCTION

CROSS REFERENCE TO RELATED APPLICATIONS

This application claims the benefits of U.S. Provisional Application Ser. No. 62/283,719 filed by the present inventor on Sep. 10, 2015.

FIELD OF THE INVENTION

This invention relates generally to the field of using a computer system to assist in teaching. More particularly, this invention provides an interactive computer tutoring system to assist students in learning how to construct proofs.

BACKGROUND

Many students struggle in learning how to construct proofs associated with logic, mathematics, computer science, and other studies. Traditional proof construction teaching methods are insufficient for some students. Traditional homework exercises in proof construction do not provide timely feedback for students to rectify any learning deficiencies. As a result, some students are moved to the next topic before they have mastered the previous topic in the proof construction course.

Objectives and Advantages

The invention aims to supplement traditional proof construction teaching methods and assist students in efficiently learning proof construction. The invention provides an interactive computer tutoring system that a user or student uses to learn proof construction at the users personal pace of learning. The system provides immediate feedback to a student on the student's learning progress, and on mistakes that need to be corrected. With traditional homework exercises, it may be days before the student receives any feedback. The system trains the student to be thorough and complete the proof construction in a precise and detailed manner. In traditional proof construction where a student writes the assertions, some students do not write all the essential assertions and skip assertions that state the obvious. The trait of thoroughness is especially important for students who write code and algorithms which need to be written in a thorough manner.

SUMMARY

The invention provides a computerized tutoring system on how to construct proofs associated with mathematics, logic, computer science, and other studies. The system presents proof problems with assumptions and assertions to a student. After studying a problem and its assumptions and assertions, the student employs computer and user interaction techniques to choose the needed assumptions and assertions and to properly connect them together to accomplish the proof. The tutoring system enables the student to develop the skills of proof construction at the student's pace of learning. The system provides immediate feedback to the student on the student's learning progress and on any mistakes that need to be corrected.

DESCRIPTION OF THE INVENTION

The invention may be used to tutor complex proof construction problems associated with logic, mathematics, computer science, and other subjects, but a simple logic proof problem will be used to illustrate and demonstrate the basic concepts of the invention.

A main element of the tutoring system is programming a user interactive computer such as a personal computer, tablet, or smart phone to correctly respond to the user interactions associated with solving the proof construction problem.

Assumptions and assertions are used in solving the proof problem. An assumption is a fact or information that is considered valid without need of substantiation. An assertion is a statement or information that needs substantiation before it is considered valid. In this tutoring system, assertions are substantiated and validated by connecting them to assumptions and other assertions as demonstrated later below.

The assumptions and assertions are expressed in natural language that may be combined with mathematical terms, equations, formulas, programming codes, theorems, and other terms as needed. Instead of the terms "assumption" and "assertion", other terms conveying similar meanings such as "given", "evidence", "fact", "clue", "allegation", "claim", "lead", "statement", etc may be used.

With this tutoring system, the list of movable assumptions and list of movable assertions must have appropriate assumptions and assertions needed to complete the proof; this also applies when the proof problem allows more than one way to accomplish the proof. The movable assumptions and assertions may be stored in remote facilities such as a server, and the student is provided access to the facilities to search and choose the appropriate assumptions and assertions. The list may also have inappropriate assertions that are not needed for the proof. The addition of inappropriate assertions to the list makes it more challenging for a student to choose an appropriate assertion from the list. The tutoring system requires the student to carefully examine the list to choose an appropriate assertion instead of writing the assertion as it is done in traditional proof construction. The assertion selection process trains the student to recognize and understand what constitutes the appropriate assertion so the student will know how to write it when needed.

The quantity and type of assertions available on the list may be controlled to make it easier for a beginning student to learn proof construction. In this case, a limited number of assertions are made available at any given time so the student is not overwhelmed by a large quantity of assertions. Only a limited number of assertions containing appropriate assertions that are needed to complete a specific part of the proof construction are made available to the student. When the student completes the specific part of the proof construction, another batch of appropriate and inappropriate assertions are made available for the student to complete another specific part of the proof. This process continues and guides the student until the proof construction is completed. When the student has gained some proficiency in proof construction, the tutoring system may be programmed to reduce the granularity required for parts of a proof where the student is already knowledgeable in, and allows the student to use abbreviated proof construction for the knowledgeable parts. The above describes ways for adjusting the level of tutoring to suit the needs of a user.

Figure 1:
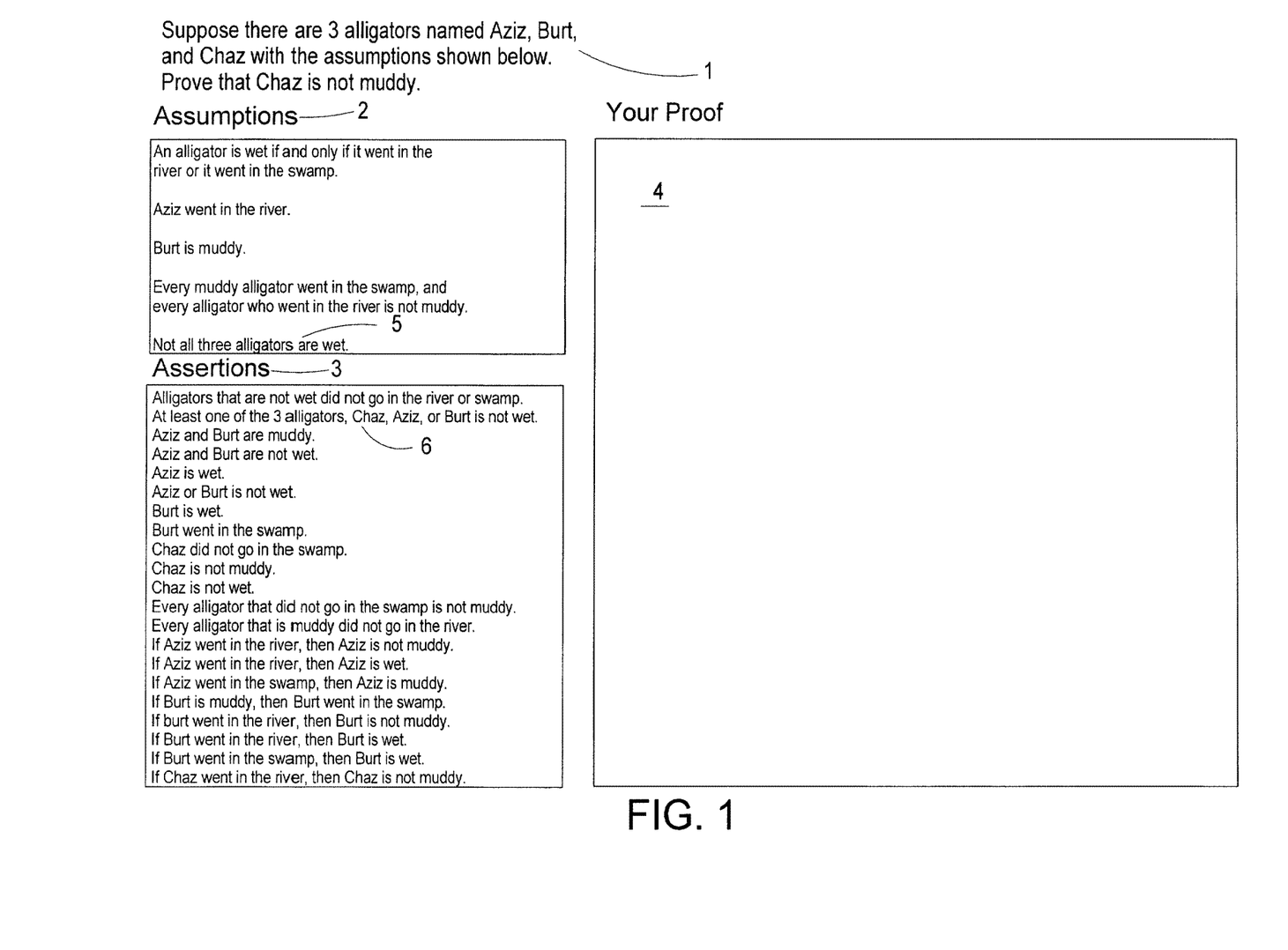
FIG. 1 shows a drawing of what a student sees on the computer monitor screen when a computer loaded with a simple logic proof problem is turned on. The drawing shows a description of the proof problem, a list of movable assumptions, a list of movable assertions, and the proof box where the proof construction occurs.

FIG. 1 shows a drawing of what the student observes on the computer monitor when the interactive computer system that has installed the simple logic proof problem is turned on. Numeral 1 indicates the description of the simple logic proof problem.

Numerals 2 and 3 in FIG. 1 indicate a list of movable assumptions and a list of movable assertions respectively. Each proof problem has its own lists of assumptions and assertions. The text of assumptions may italicized to distinguish them from assertions.

Numeral 4 in FIG. 1 is the proof box, which is a designated area on the computer monitor screen. The proof box may have scroll bars to increase the size of the proof box. The proof box is where the proof construction occurs. A student uses a mouse or touch pad and conventional computer and user interaction techniques like "click and drag" or "touch and drag" to move assumptions and assertions from the lists into the proof box, and uses "select" and "click" to connect the assumptions and assertions to construct the proof. This process is further explained and illustrated in the next section.

Operation of the Tutoring System

A user or student installs the simple logic proof exercise software into the computer and observes FIG. 1 on the computer monitor. The student studies the proof problem indicated by numeral 1, and the assumptions and assertions indicated by numerals 2 and 3 to determine which assumption or assertion should be initially moved into the proof box indicated by numeral 4. It is possible for the student to start the proof construction with any assumption or assertion and complete the proof in a round about manner like approaching the proof backward or using a mixture of going forward and backward to solve the proof problem. However, it is best for the student to use his logic to determine and start with what he thinks will result in the most direct approach to the proof Lets assume the student chooses the assumption "Not all of the three alligators are wet" to start the proof construction. The student uses click and drag to move the assumption to the upper left corner of the proof box.

Figure 2:
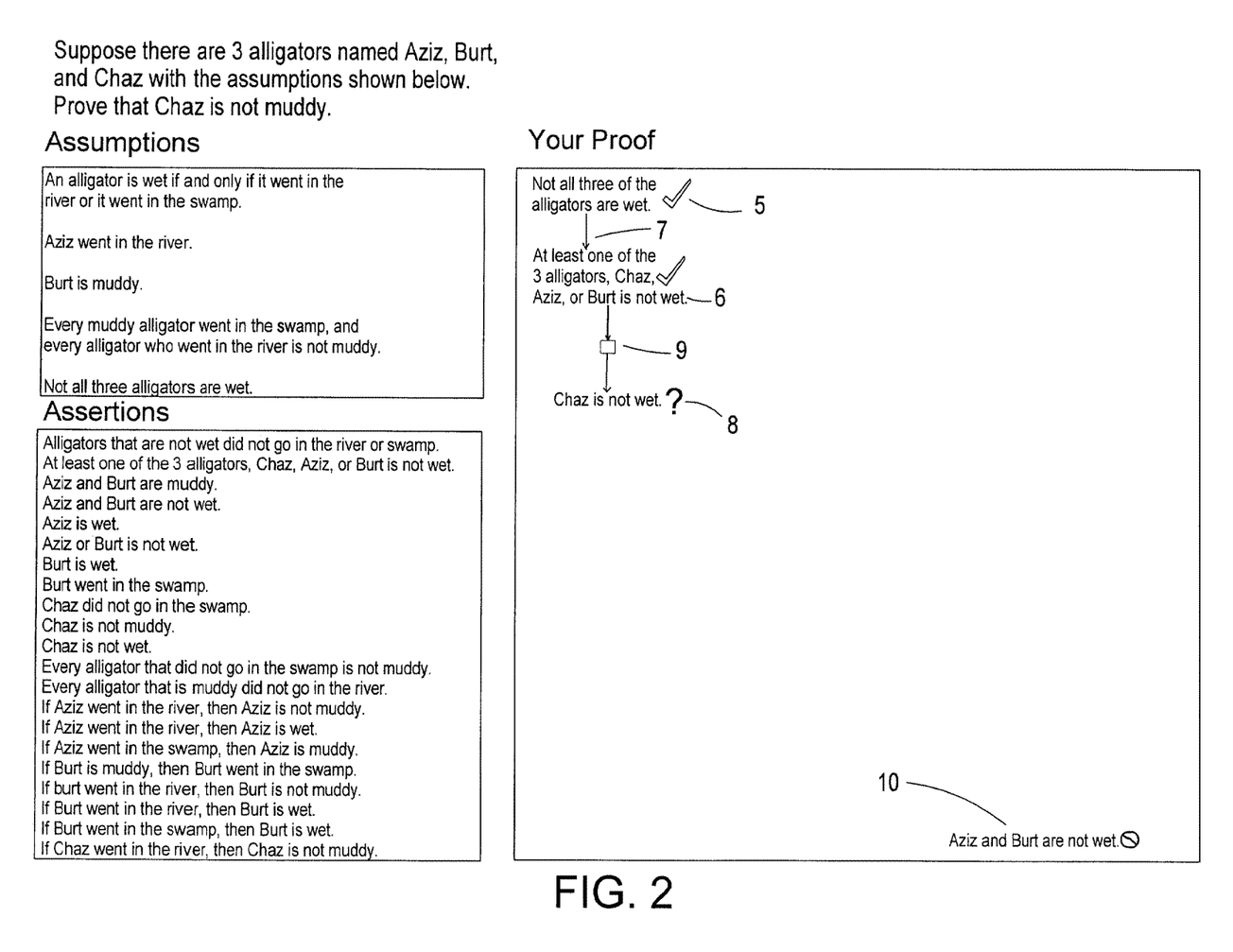
FIG. 2 depicts a drawing of what is on the computer monitor after the student uses click and drag to move an assumption and two assertions into the proof box and connects the assumption and assertions.

Look at FIG. 2; "Not all of the three alligators are wet" appears with a check mark near the upper left corner of the proof box as indicated by numeral 5. The check mark indicates the assumption "Not all of the three alligators are wet" is validated and needs no further substantiation. Now the student decides what should follow from "Not all of the three alligators are wet". The student chooses "At least one of the 3 alligators, Chaz, Aziz or Burt is not wet" which the student uses click and drag to move to a location in the proof box below "Not all of the three alligators are wet" as shown by numeral 6 in FIG. 2. Assertion "At least one of the 3 alligators, Chaz, Aziz or Burt is not wet" initially appears with a question mark; the question mark means further substantiation of this assertion is needed to validate it. The student clicks "Not all of the three alligators are wet" to select it, and then the student clicks "At least one of the 3 alligators, Chaz, Aziz or Burt is not wet". A connecting line or arrow indicated by numeral 7 appears to connect the assumption and assertion, and the question mark initially associated with the assertion is replaced with a check mark as shown in FIG. 2.

At any time during the proof construction process, the student may use click and drag to move any assumption or assertion in the proof box to a more orderly location to arrange for a tidy presentation of the proof construction. If the student makes a mistake and moves an assertion that is inappropriate like that indicated by numeral 10, the student may move the unneeded assertion to a location near the bottom of the proof box as shown in FIG. 2. Also, if the student moves an assumption or assertion into the proof box that will not connect with what he is trying to substantiate, but the assumption or assertion may be used later on, it may also be moved to the bottom of the proof box where it may be retrieved when it is needed, or it may be returned to the list where it came from.

Now that assumption "Not all of the three alligators are wet" is connected to assertion "At least one of the 3 alligators, Chaz, Aziz or Burt is not wet", the student determines what should follow the assertion. The student logically chooses the assertion "Chaz is not wet" and moves it into the proof box as shown by numeral 8 in FIG. 2. When the student connects it with "At least one of the 3 alligators, Chaz, Aziz or Burt is not wet", a conjunction indicator, indicated by numeral 9, appears with the connecting arrows as shown in FIG. 2. In addition, a question mark appears with the assertion indicated by numeral 8. This means that more than one assertion and or assumption need to be connected with the conjunction indicator to validate the assertion and remove the question mark.

The question mark is a visual aid for the student and is not necessary for the invention since an assertion without a check mark means the assertion is not validated regardless of the question mark. A conjunction indicator makes it easier for students to visualize that more than one assertion need to conjoin at the conjunction indicator to substantiate the assertion. The conjunction indicator may be omitted in a minimal embodiment of the invention, and the substantiating assertions are connected directly to the assertion being validated in the minimal embodiment. For complex proof problems, there may be a need to disjoin an assertion into multiple cases in a complex proof. The tutoring system will provide a disjunction indicator in this situation.

Figure 3:
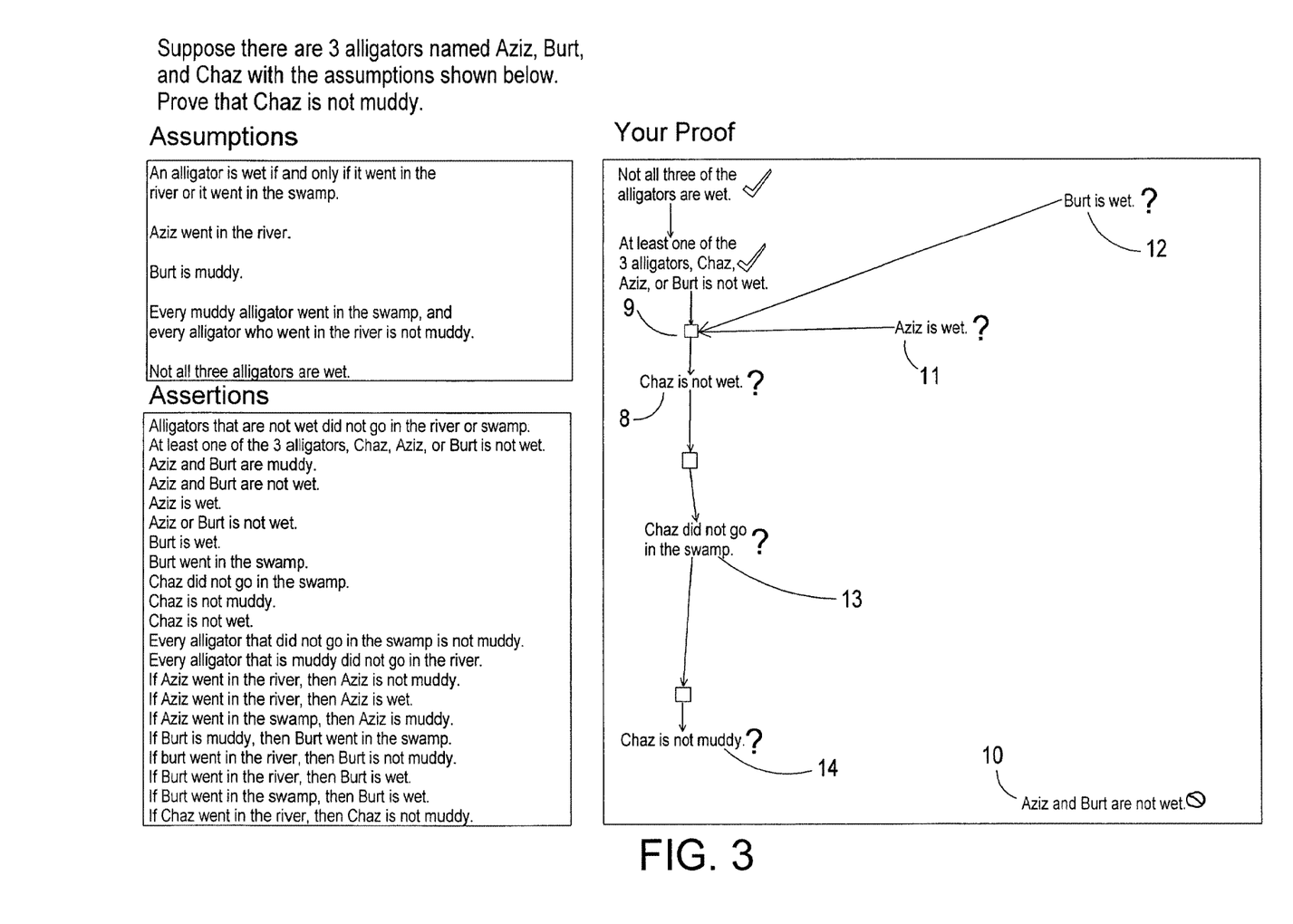
FIG. 3 depicts a drawing of what is on the computer monitor after the student uses click and drag to move additional assertions into the proof box and connects them accordingly, and the use of a conjunction indicator.

Look at FIG. 3. The student moves assertion "Aziz is wet" into the proof box and connects it to the conjunction indicator. The question mark associated with "Chaz is not wet" does not change into a check mark until the student also moves "Burt is wet" into the proof box and connects it to the conjunction indicator. Hence three assertions "At least one of the 3 alligators, Chaz, Aziz or Burt is not wet" (6), "Aziz is wet" (11), and "Burt is wet" (12) are needed to conjoin at the conjunction indicator to validate the assertion "Chaz is not wet" (8). Note the question marks associated with assertions (11) and (12) indicating the assertions need substantiation to become valid.

Figure 4:
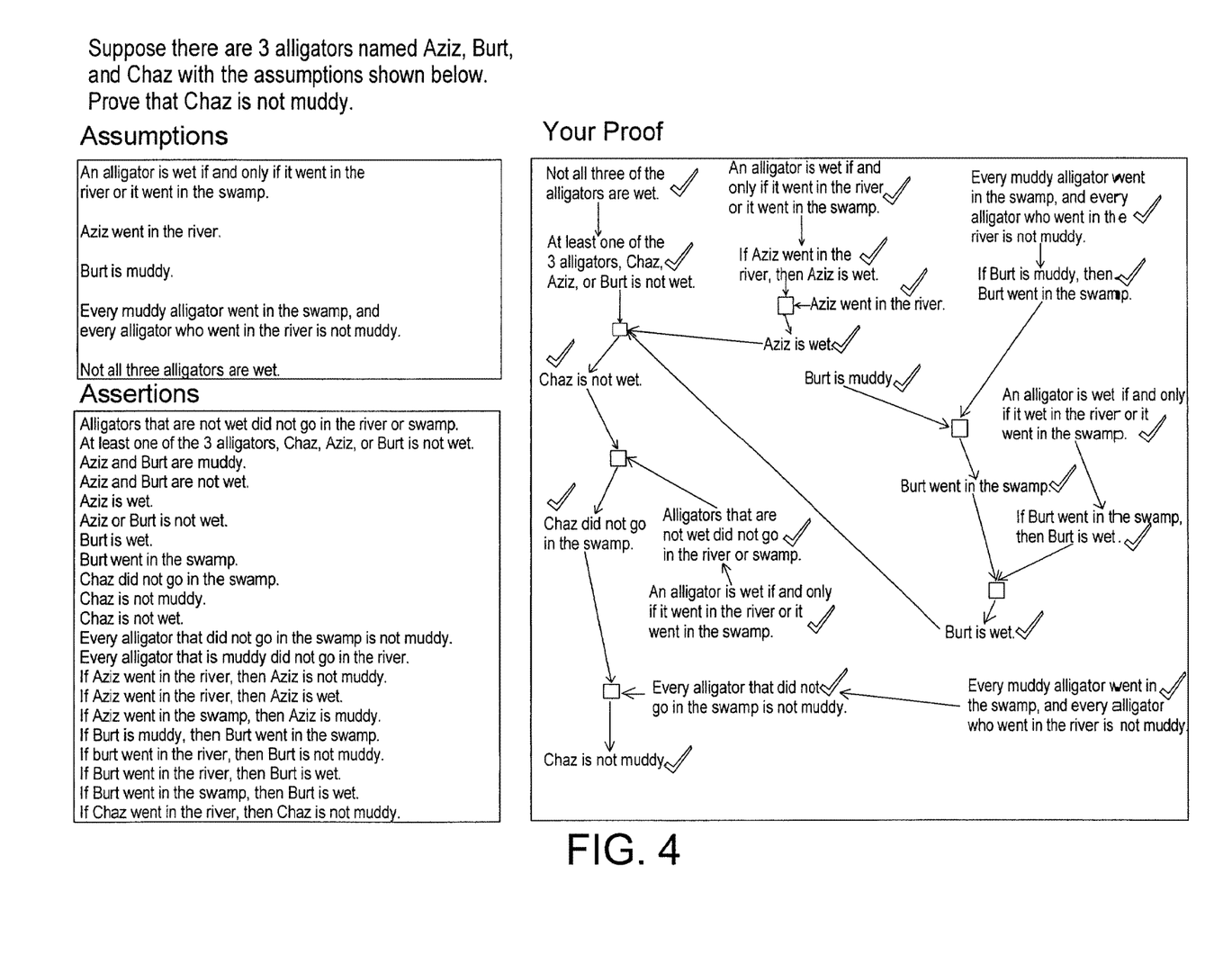
FIG. 4 depicts a drawing of the completed solution of the simple logic proof problem shown on the computer monitor screen.

Now the student determines what should follow the validated "Chaz is not wet" (8). The student moves assertions "Chaz did not go in the swamp" (13) and "Chaz is not muddy" (14) into the proof box and connects them as shown in FIG. 3. The question marks associated with the assertions shown in FIG. 3 must be converted into check marks by connecting additional appropriate assertions and assumptions to validate the assertions. FIG. 4 shows what the student did to convert the question marks into check marks and successfully proved "Chaz is not muddy". The proof problem is solved when the problem's goal assertion ("Chaz is not muddy") and all the interconnected assertions and assumptions leading to the goal assertion are validated and all show check marks. Compare FIG. 4 with FIG. 3 and note that the student used click and drag to arrange the proof solution structure so the display of the proof construction is tidy and easy to follow.

Note in FIGS. 2, 3, and 4 that when the student used click and drag to move an assumption or assertion into the proof box, a copy of the assumption or assertion appears in the proof box and the original assumption or assertion remains on the list. This copy feature, like the conjunction indicator and question mark, is not necessary for the invention to work. The copy feature is handy when the same assumption or assertion is used many times in the construction of a proof. Multiple copies eliminate many messy connecting lines or arrows, and provide for a more orderly display of the proof construction. Besides the connection indicator being a line or arrow, other connection indicators include indentation, indent marks, and other marks.

Other Embodiments of the Invention

FIG. 4 shows a fairly tidy display of a proof solution structure of a simple logic proof. A display of a more complex proof involving more assertion validations would not be as tidy unless the proof box is scrollable. However, a scrollable proof box does not allow the user to see everything at once. Small display screens of mobile computers also pose a challenge to displaying the entire proof construction with one sighting. Some ways of ameliorating this display problem include hiding completed portions of the proof from view in the display or reducing the granularity of these portions to show them in abbreviated form.

A simple way to alleviate the display challenge is eliminating the text, question marks, and check marks associated with the assumptions and assertions. To eliminate the text, each assumption and each assertion is assigned and represented with a small unique symbol. Many kinds of marks are available to be a symbol; for example, the symbol may be a figure or a series of characters.

Figure 5:
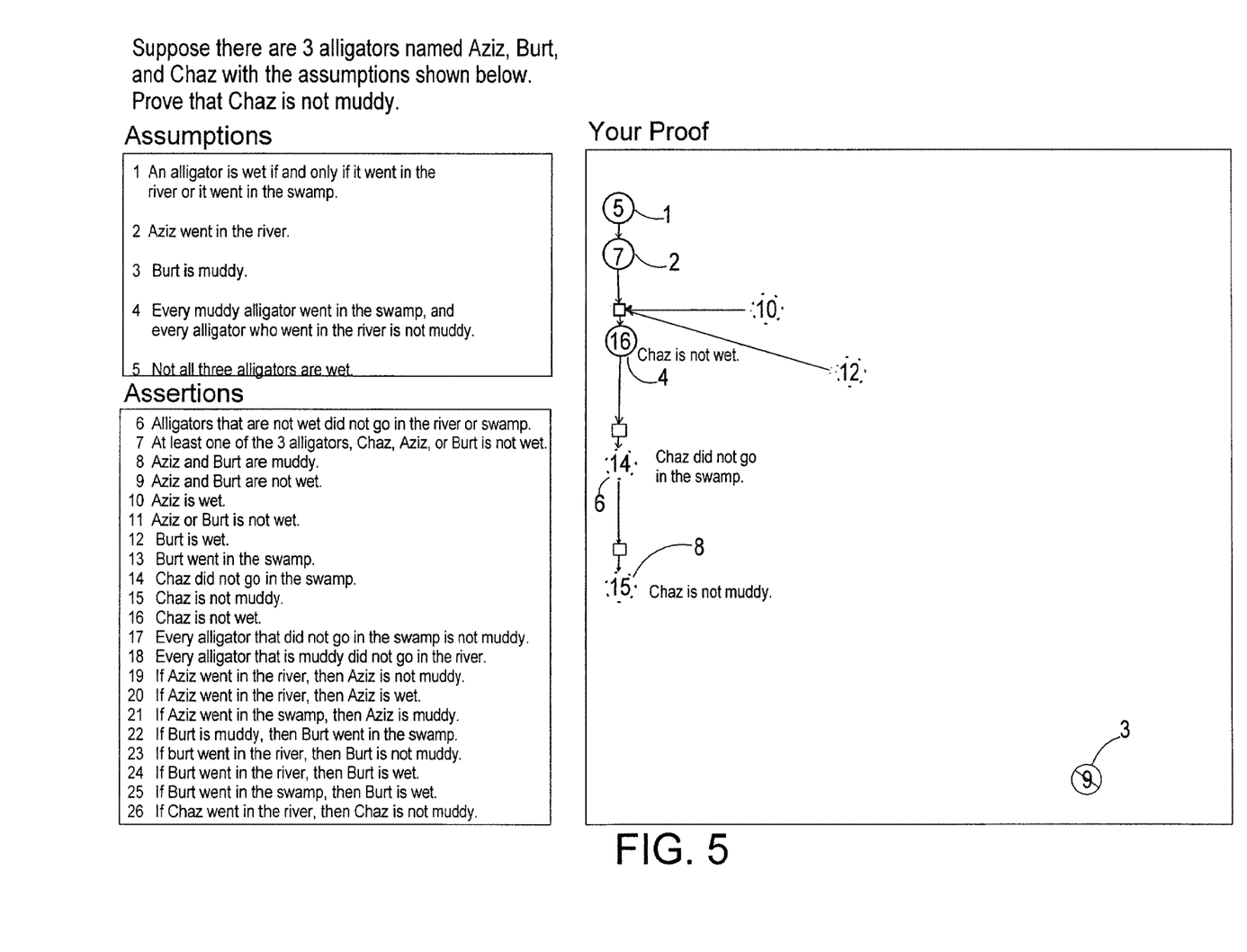
FIG. 5 depicts a drawing showing the use of symbols in the form of small circles encircling specific numbers to represent the assumptions and assertions, a solid line circle to replace the check mark, and a dotted line circle to represent the question mark in the proof construction.

FIG. 5 illustrates this concept. In the simple logic proof problem, the symbols are consecutive numbers 1 to 26 as shown to the left of the texts of the assumptions and assertions in the lists of the proof problem in FIG. 5. Besides being shown to the left before each text, the symbol may be shown after each text, or is not displayed with the text on the lists and is shown with the text after the assumption or assertion is moved into the proof box. When a student uses click and drag to move the assumption "Not all of the three alligators are wet" into the proof box, the text of the assumption and the symbol "5" encircled by a solid line circle will appear in the proof box, but the student in this case toggled off the text to reduce clutter. After moving an assumption or assertion into the proof box, the text of the assumption or assertion may be toggled off and on by right clicking the symbol of the assumption or assertion. Numerals 4, 6, and 8 in FIG. 5 show the text associated with assertion symbol "16", "14", and "15" turned on; this text may be turned off at anytime by right clicking the symbols, and turned on again by right clicking the symbol again. The ability to turn off the text helps to greatly reduce clutter in the proof display.

A circle encircling the symbol is used to eliminate the check mark and question mark. A solid line circle replaces the check mark and indicates the assumption or assertion is valid and needs no substantiation. The absence of the circle indicates an assertion is not validated or a dotted or dashed line circle may replace the question mark to indicate the assertion is not validated. In the above example of the symbol "5" enclosed by a solid line circle as shown as numeral 1 in FIG. 5, the solid line circle indicates the assumption represented by the symbol "5" is validated. Continuing with the example, the student moves the assertion "Not all of the three alligators are wet" into the proof box, it appears as the symbol "7" encircled by a dotted line circle. The dotted line circle means the assertion needs substantiation to be validated. When the student connects symbol "5" to symbol "7" with a connecting arrow to provide the substantiation, the dotted line circle of symbol "7" changes into a solid line circle to indicate the assertion represented by symbol "7" is validated as shown by numeral 2 in FIG. 5. Numerals 6 and 8 show dotted line circles encircling assertion symbols "14" and "15" to indicate the assertions represented by the symbols are not validated. As in the previous embodiment, the conjunction indicator and the status indicator of a dotted line circle are optional and may be omitted in a minimal embodiment. An assertion that is inappropriate is displayed in the proof box with a line through the symbol as shown by numeral 3 in FIG. 5.

Another embodiment adds a test box to the tutoring system. Some proof problems involve assertions which reference algorithms or formulas that need to be tested for the assertions to be validated instead of connecting them to other assertions or assumptions for validation. To handle these problems, a test box in addition to the proof box is provided for a student to write code and perform math operations to test the algorithm or formula in order to validate the assertion.

The tutoring system may contain gauges to assess the performance of the student in proof construction. The gauges include measuring the amount of time the student takes to complete the proof, measuring the amount of inappropriate assertions that the student moved into the proof box, and counting the unsuccessful attempts at connecting assumptions and assertions. The presence of performance assessment gauges with negative connotations for moving inappropriate assertions and unsuccessful connecting attempts could help to discourage students from using a random trial and error process in solving the proof.

Another embodiment incorporates features like sound effects, voice messages, animations, and videos during the proof construction process to make the process entertaining. The entertaining means may involve audio and visual effects. For example, when appropriate, "(Applause sound effect) You have validated the assertion!" or "(Applause sound effect) You have successfully completed the proof!" Animation or video may be used to help in describing an assumption or assertion when they are amenable to them. For example, an animation or video of an alligator going into a swamp and emerging muddy could be used in the simple logic proof problem.

Variations and Ramifications of the Invention

There are many variations that may be used. Instead of using a mouse, touch screen, or touch pad to move and connect the assumptions and assertions, there are other means to make the needed interactive maneuvers. The other means include using a keyboard or voice activation to move the assumptions and assertions into the proof box, and to make commands to move and connect the assumptions and assertions required for the proof construction.

The solid line circle, dotted line circle, check mark, and question mark are considered status indicators for indicating the status of an assumption or assertion as validated, or the status of an assertion as not validated. There could be many variations in the status indicator. For example, the check mark and question mark may be replaced by a smiley face and frowning face drawings. The circle line may be colored as a visual aid; e.g., the dotted line circle may be orange colored, and the solid line circle may be green colored.

Instead of a circle enclosing the symbols as shown in FIG. 5, other appropriate geometric shapes may be used; e.g., square, octagon, hexagon, etc. Another variation is that the circle and other geometric-shaped enclosures enclosing the symbols may be omitted and the validation status is indicated only by the color of the symbol or text; e.g., a green colored symbol or text indicates validated, and an orange color indicates not validated. The size of a symbol can also be used to indicate the validation status of the symbol; e.g., a large size symbol means validated, and a small size symbol means not validated.

The invention may be adapted to facilitate the writing of a proof. Instead of using a pen and paper to write a proof, a user creates the needed assertions and enters them into the system as the list of assertions. The user employs the function of the system to construct his proof. This is somewhat like somebody using a word processor to write a document instead of using pen and paper.

The invention may be modified and adapted for use as a system for engineers to confirm that the engineering design for a proposed or existing product meets safety standards or other required criteria.

Other ramifications and variations of the basic concept which have not been described will be apparent to those skilled in the arts. It is intended that all such ramifications and variations be included within the scope of the invention, and the scope of the invention not be limited by the examples given.

I claim:

1. A method for tutoring a user on proof construction, comprising:
   (a) providing a proof construction problem;
   (b) providing access to listings of movable assumptions and assertions needed for solving said problem;
   (c) providing a user interactive computer;
   (d) providing a moving means for the user to move in the computer, an assumption or an assertion chosen from the assumptions and assertions available from step (b) after the user considers the available assumptions and assertions;
   (e) providing a connecting means for the user to interconnect an assertion with an assumption or another assertion that are moved in the computer,
   (f) indicating the status of the user interaction, via said computer in solving the problem;
   (g) choosing and moving assumptions and assertions in the computer by a user;
   (h) interconnecting the moved assumptions and assertions by the user;
   (i) indicating, via the computer, the status of the user interaction, wherein the status includes: (1) moved assumption or assertion and a status indicator indicating if the assumption or assertion is validated, and (2) a connection indicator to indicate the interconnection of an assertion, an assumption or another assertion;
   (k) providing a user performance assessment gauge, said gauge may include one or more but not limited to the following: the computer registering the solved proof problem, measuring the amount of time needed to complete the proof, counting the number of inappropriate assertions moved into a proof box, and counting the number of unsuccessful attempts to interconnect assertions with assumptions or other assertions;
   (j) repeating the above steps (g), (h), and (i) until the proof problem is solved with all the needed assumptions and assertions are interconnected and validated.

2. The method of claim 1 further including using symbols to represent the assumption and assertions in steps (d) through (j).

3. The method of claim 1 wherein said status indicator is a check mark when the assumption or assertion is validated.

4. The method of claim 1, further including providing a status indicator to indicate when an assertion is not validated, said status indicator being a question mark.

5. The method of claim 1, further including providing an entertaining means for entertaining the user during solving the proof problem, said entertaining means including involving voice messages, videos, audio effects, and animations issued by the computer in response to user interactions with said computer in solving the problem.

6. The method of claim 1, further including providing an adjusting means for adjusting the level of tutoring to suit the needs of a user.

7. The method of claim 1, further including providing a conjunction indicator or a disjunction indicator.

8. The method of claim 1, further including providing a test box for testing the validity of an assertion.

9. The method of claim 1 wherein said connection indicator is a connecting line or arrow.

10. A method for tutoring a user on proof construction, comprising:
    (a) providing a proof construction problem;
    (b) providing access to listings of movable assumptions and assertions needed for solving said problem, and each assumption and assertion assigned a unique symbol,
    (c) providing a user interactive computer;
    (d) providing a moving means for the user to move in said computer an assumption or an assertion or their symbols that are chosen from the assumptions and assertions available from step (b) after the user studied the available assumptions and assertions;
    (e) providing a connecting means for the user to interconnect an assertion or its symbol with an assumption or its symbol or another assertion or its symbol, that are moved in said computer;
    (f) programming said computer to indicate the status of user interaction, via said computer in solving said problem;
    (g) choosing and moving assumptions and assertions into said computer by a user as provided by step (d);
    (h) interconnecting the moved assumptions and assertions by said user as provided by step (e);
    (i) indicating, via the computer, the status of the user interaction, wherein the status includes:
        (1) the symbol and or text of the entered assumption or assertion and a status indicator associated with the assumption or assertion indicates if the assumption or assertion is validated, and (2) a connection indicator to indicate the interconnection of an assertion with an assumption or another assertion, (j) repeating the above steps (g), (h), and (i) until the proof problem is solved with all assumptions and assertions needed to solve the proof problem interconnected and validated;

(k) providing a user performance assessment gauge, said gauge may include one or more but not limited to the following: the computer registering the solved proof problem, measuring the amount of time needed to complete the proof, counting the number of inappropriate assertions moved into a proof box, and counting the number of unsuccessful attempts to interconnect assertions with assumptions or other assertions.

11. The method of claim 10 wherein said status indicator is a solid line circle enclosing the symbol when the assumption or assertion is validated.

12. The method of claim 10, further including a status indicator to indicate when an assertion is not validated, said status indicator being a dotted line circle.

13. The method of claim 10, further including providing a control for the user to make the text of a specific assumption or assertion displayed on the computer screen disappear and reappear as desired by the user.

14. The method of claim 10, further including providing an entertaining means for entertaining the user during solving the proof problem, said entertaining means including involving voice messages, videos, audio effects, and animations issued by the computer in response to user interactions with said computer in solving the problem.

15. The method of claim 10, further including providing an adjusting means for adjusting the level of tutoring to suit the needs of a user.

16. The method of claim 10, further including providing a conjunction indicator or a disjunction indicator.

17. The method of claim 10, further including providing a test box for testing the validity of an assertion.

18. The method of claim 10 wherein said connection indicator is a connecting line or arrow.

19. An interactive computer system for tutoring proof construction, comprising:
(a) a user interactive computer;
(b) a proof construction problem;
(c) access to listings of movable assumptions and assertions needed for solving said problem;
(d) a moving means for a user to move in said computer, an assumption or assertion chosen from the assumptions and assertions from above (c);
(e) a connecting means for a user to interconnect the assumptions and assertions moved in said computer;
(f) indicating the status of a user interaction with said computer in solving said problem, said status includes:
　(1) the moved assumption or assertion and a status indicator associated with the assumption or assertion indicating if the assumption or assertion is validated,
　(2) a connection indicator to indicate the interconnection of an assertion with an assumption or another assertion, and
　(3) an indicator to indicate when the proof problem is solved with all assumptions and assertions interconnected and validate;
(g) providing a user performance assessment gauge, said gauge may include one or more but not limited to the following: the computer registering the solved proof problem, measuring the amount of time needed to complete the proof, counting the number of inappropriate assertions moved into a proof box, and counting the number of unsuccessful attempts to interconnect assertions with assumptions or other assertions.

20. The system of claim 19, further including providing symbols to represent the assumptions and assertions.

21. The system of claim 19 wherein said status indicator is a solid line circle when the assumption or assertion is validated.

22. The system of claim 19, further including providing a status indicator to indicate when an assertion is not validated, said status indicator being a dotted line circle.

23. The system of claim 19, further including providing a control for the user to make the text of a specific assumption or assertion displayed on the computer screen disappear and reappear as desired by the user.

24. The system of claim 19, further including providing an entertaining means for entertaining the user during solving the proof problem, said entertaining means including involving voice messages, videos, audio effects, and animations issued by the computer in response to user interactions with said computer in solving the problem.

25. The system of claim 19, further including providing an adjusting means for adjusting the level of tutoring to suit the needs of a user.

26. The system of claim 19, further including providing a test box for testing the validity of an assertion.

27. The system of claim 19 wherein said connection indicator is a connecting line or arrow.

* * * * *